United States Patent
Connolly et al.

[15] 3,690,176
[45] Sept. 12, 1972

[54] TEMPERATURE SENSING APPARATUS

[72] Inventors: Douglas P. Connolly, Webster; Raymond E. Poehlein, Penfield, both of N.Y.

[73] Assignee: Xerox Corporation, Stamford, Conn.

[22] Filed: April 26, 1971

[21] Appl. No.: 137,302

[52] U.S. Cl. .................................................. 73/351
[51] Int. Cl. ........ G01k 1/14, G01k 7/16, G01k 13/08
[58] Field of Search ...................................... 73/351

[56] References Cited

UNITED STATES PATENTS

| 2,480,703 | 8/1949 | Bradner et al. ............... 73/351 |
| 2,712,236 | 7/1955 | Bennett et al. ............... 73/351 |
| 3,357,249 | 12/1967 | Bernous et al. ............... 73/351 |

Primary Examiner—Louis R. Prince
Assistant Examiner—Frederick Shoon
Attorney—James J. Ralabate, Donald F. Daley and Melvin A. Klein

[57] ABSTRACT

Temperature sensing apparatus in which a temperature responsive member is maintained in a self aligning position with a predetermined force on the surface of a heated rotating or stationary roll surface. Support is given on a crowned pin member which enables the temperature responsive member to rock perpendicular and parallel to the heated roll axis. This rocking action assures self alignment of the member with the roll surface. Also a counterweight is used to impart a predetermined moment about a second axis between the member and roll surface.

5 Claims, 5 Drawing Figures

INVENTORS.
DOUGLAS P. CONNOLLY
RAYMOND E. POEHLEIN
BY Melvin A. Klein
ATTORNEY

TEMPERATURE SENSING APPARATUS

This invention relates in general to temperature responsive resistance devices and in particular to a self aligning temperature sensitive resistance device adapted to be maintained in intimate contact with a rotating centrally heated cylinder or the like.

In xerographic copiers using a heated pressure roll to fuse the xerographic image, it is important that the heated roll surface be maintained within a suitable temperature range to properly fuse the toner image to its paper support sheet. With the advent of high speed copying/duplicating machines, various problems resulted in properly sensing the temperature of the heated roll surface by what is commonly referred to as a thermistor which is placed in physical contact with the heated roll. In the event that the temperature of the roll surface would increase beyond a predetermined point, the xerographic image would offset to the heated roll, or the moisture content reduced resulting in the paper curling and creating paper jams or a potential fire hazard.

While the invention has general utility, for convenience of illustration it will be described with reference to its use in a xerographic fusing device of the type described in U.S. Pat. No. 3,291,466 filed in the name of Gilbert A. Aser et al. on Sept. 30, 1964, and specifically is intended as an improvement over U.S. Pat. No. 3,357,249 entitled Temperature Sensor.

It is therefore an object of this invention to improve thermal control devices to rapidly and accurately sense temperature.

Another object of this invention is to improve temperature sensor devices by preventing the temperature responsive element from abrading the surface to be sensed.

A further object of this invention is to maintain good thermal contact of a temperature responsive resistance device with a roll surface which is either rotating or stationary.

A still further object of this invention is to ensure rapid and accurate response by temperature responsive resistance devices sensing a centrally heated roll surface used for fusing xerographic images.

These and other objects are attained in accordance with the present invention wherein there is provided a self aligning specially contoured temperature sensitive resistance element.

Further objects of this invention, together with additional features contributing thereto and advantages accruing therefrom, will be apparent from the following description of several embodiments of the invention when read in conjunction with the accompanying drawings, wherein.

Figure 1:
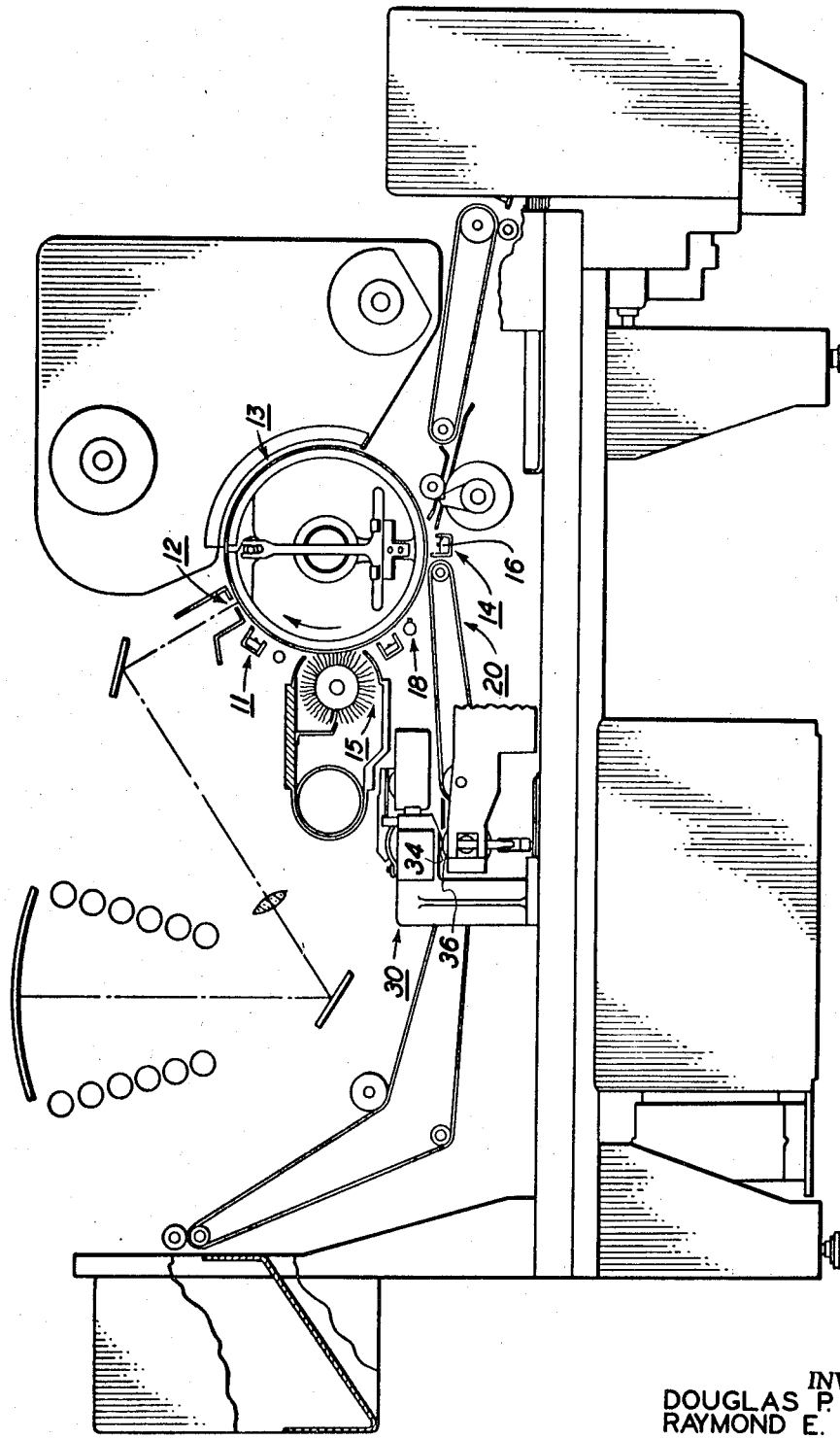
FIG. 1 is a front elevation view of an automatic xerographic reproducing machine utilizing the present invention.

Referring now to FIG. 1, there is shown an embodiment of the subject invention in a suitable environment such as an automatic xerographic reproducing machine having a xerographic plate including a photoconductive layer or light-receiving surface on a conductive backing and formed in the shape of a drum 10 which is mounted on a shaft journaled in a frame to rotate in the direction indicated by the arrow to cause the drum surface sequentially to pass a plurality of xerographic processing stations.

For the purpose of the present disclosure, the several xerographic processing stations in the path of movement of the drum surface may be described functionally, as follows:

A charging station 11, at which a uniform electrostatic charge is deposited on the photoconductive layer of the xerographic drum;

An exposure station 12, at which a light or radiation pattern of copy to be reproduced is projected onto the drum surface to dissipate the drum charge in the exposed areas thereof thereby forming a latent electrostatic image of the copy to be reproduced;

A developing station 13, at which xerographic developing material, including toner particles having an electrostatic charge opposite to that of the electrostatic latent image, are cascaded over the drum surface, whereby the toner particles adhere to the electrostatic latent image to form a xerographic powder image in the configuration of the copy being reproduced;

A transfer station 14, at which the xerographic powder image is electrostatically transferred from the drum surface to a transfer or support material; and A drum cleaning and discharge station 15, at which the drum surface is brushed to remove residual toner particles remaining thereon after image transfer, and at which the drum surface is exposed to a relatively bright light source to effect substantially complete discharge of any residual electrostatic charge remaining thereon.

It is believed that the foregoing description is sufficient for the purposes of this application to illustrate the general operation of a xerographic reproducing apparatus utilizing an improved temperature sensing apparatus constructed in accordance with the invention. For further details concerning the specific construction of the xerographic apparatus shown, reference is made to U.S. Pat. No. 3,301,126 in the name of Robert F. Osborne et al entitled Reproducing Apparatus.

At the transfer station 14, the transfer of the xerographic powder image from the drum surface to the sheets of support material is effected by means of a corona transfer device 16 that is located at or immediately after the line of contact between the support material and the rotating drum. In operation, the electrostatic field created by the corona transfer device is effective to tack the support material electrostatically to the drum surface, whereby the support material moves synchronously with the drum while in contact therewith. Simultaneously with the tacking action, the electrostatic field is effective to attract the toner particles comprising the xerographic powder image from the drum surface and causes them to adhere electrostatically to the surface of the support material.

Figure 2:
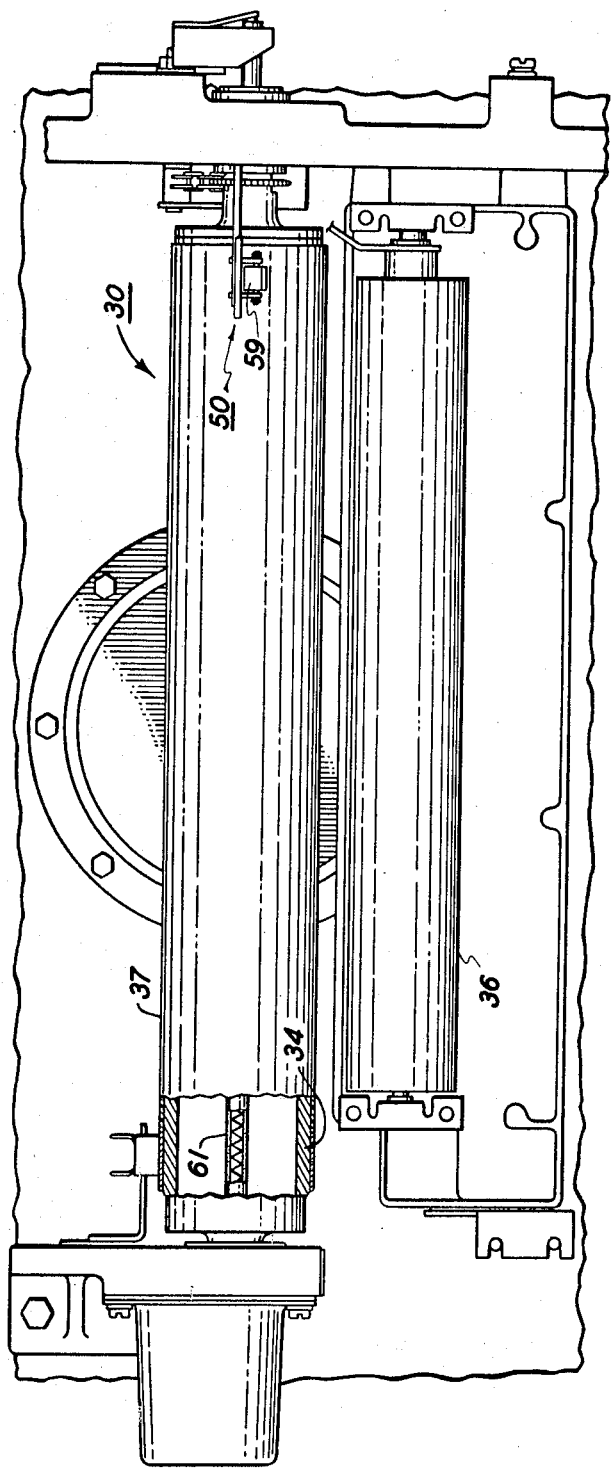
FIG. 2 is an enlarged horizontal elevation view of the xerographic centrally heated fusing roll to better illustrate the use of this invention.

Immediately subsequent to the image transfer station, there is positioned a stripping apparatus 18 for removing the sheets of support material from the drum surface. The sheet stripping apparatus is adapted to strip the leading edge of the support material from the drum surface and to direct it onto an endless conveyor 20 which carries the sheet material to a fixing heated pressure roll apparatus 30. The sheet material is passed through a centrally heated top roll or cylinder 34 and a lower roll 36 which is displaceable to permanently fix or fuse the image by a combination of heat and pressure. The centrally heated pressure roll has an outer cover 37 made of Teflon and is continuously wiped with silicone oil by a wick to prevent image offset. For further details of the specific fusing apparatus shown in FIGS. 1 and 2, reference is made in U. S. Pat. No. 3,291,466.

Figure 3:
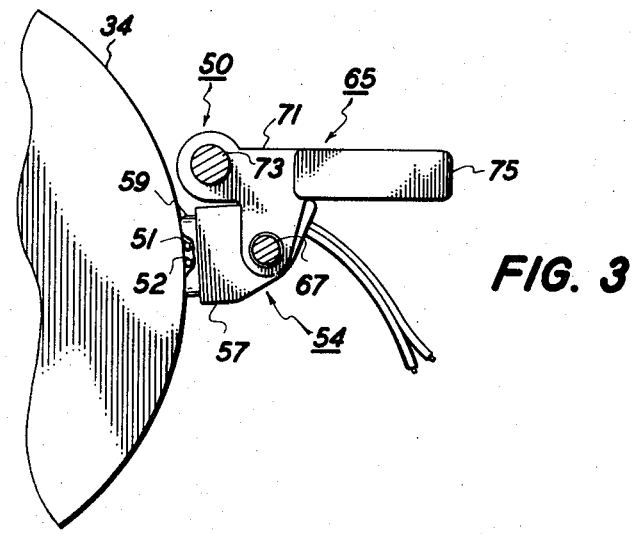
FIG. 3 is a side view of the temperature sensing apparatus of the invention.
Figure 4:
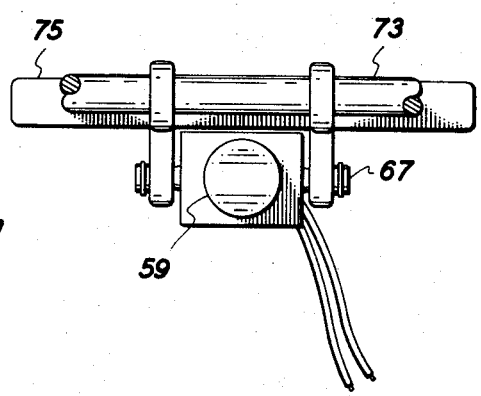
FIG. 4 is an elevation view excluding the heated roll of FIG. 3.
Figure 5:
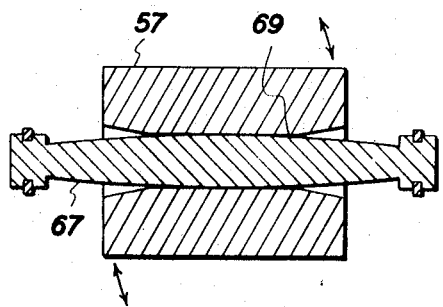
FIG. 5 is a cross-section view of the support for the temperature sensing probe to better illustrate certain details thereof.

Referring now to FIGS. 3 through 5 there is shown temperature sensing apparatus 50 according to the present invention. Temperature sensing apparatus 50 includes two temperature responsive resistance elements 51 and 52, which may be of any commercially available type glass bead thermistors, such as that available from Fenwal Electronics, Framingham, Mass., or from Victory Engineering (Veco), Springfield, New Jersey.

The temperature responsive resistance elements, or beads 51, and 52 are secured in a bead support assembly 54. Bead support assembly 54 comprises a box-like housing 57 which is made of thermally insulative material and a cap member 59 made of thermally conductive material such as beryllium copper. Beads 51 and 52 are desirably epoxied to the back of the cap member to ensure good thermal contact. It will be noted that the surface of cap member 59 is contoured to closely fit the surface of the roll. In this manner very good thermal contact is made between the cap member and the roll surface to control the temperature thereof by an electrical control circuit coupled to resistance heating element 61 as explained, for example, in U.S. Pat. No. 3,291,466.

In accordance with the present invention the temperature resistance elements are urged into good thermal contact with the roll surface by a predetermined self-aligning force as will now be explained in detail. Bead support assembly 54 is supported by a crowned pin member 67 which in turn is supported by a force exerting member 65. Pin member 67 is received in a tubular opening 69 formed in a box-like housing 57. Force exerting member 65 has an elongated portion 71 which is pivotally supported from the machine frame on a shaft 73. Elongated portion 71 has a weighted portion 75 which results in moment acting about shaft 73. It will be appreciated through this moment that creates a counterforce between the bead support assembly 54 and roll surface enabling very good thermal contact of the temperature resistance elements with the roll surface. The force should not be too great such that the surface of the roll is excessively worn. Nor should it be so small that good thermal contact is not maintained. It will be further appreciated that the housing 57 is able to rock on pin member 67 both parallel and perpendicular to the heated roll axis by virtue of its crowned shape. By the above invention good thermal contact between the temperature resistance elements and heated roll surface is obtained. With good thermal contact surface roll temperatures can be sensed and maintained closer to the desired temperature values during normal operating conditions, during initial warm-up period, and over extended periods of machine operation. In addition, the above invention enables greater tolerances in manufacturability and serviceability without detrimental effects to temperature sensing.

While the invention has been described with reference to the structure disclosed herein, it is not confined to the details set forth; and this application is intended to cover such modifications or changes as may come within the purposes of the improvements or the scope of the following claims.

What is claimed is:

1. Apparatus for sensing the surface temperature of a heated roll comprising
   temperature responsive means,
   thermally insulating first support means for supporting said temperature responsive means,
   a thermally conductive cap member positioned to encompass the end of said thermally responsive means and arranged as an extension of said first support means,
   second support means connected to said first support means and pivotally mounted by a pin member on a first axis to position said cap member into contact with the surface of a heated roll,
   said pin member received in said first support means and being of a crowned shape, and said first support means having a shape complementary to said crown shaped pin member so as to effect a rocking action of said first support means perpendicular and parallel to the heated roll axis.

2. Apparatus according to claim 1 wherein said conductive cap member is formed with a curved surface to closely fit the surface of the heated roll.

3. Apparatus according to claim 1 wherein said second support means includes a member having weighted portion spaced from said first axis to effect a moment urging said cap member against said heated roll surface.

4. Apparatus according to claim 1 wherein said heated roll is mounted for rotation.

5. Apparatus according to claim 4 wherein the distance between the pin member and conductive cap is sufficiently small to prevent moments created by frictional forces generated by rotation of the roll.

* * * * *